(12) United States Patent
Tseng (10) Patent No.: US 7,613,959 B2
(45) Date of Patent: Nov. 3, 2009

(54) DATA RECEIVING APPARATUS OF A PCI EXPRESS DEVICE

(75) Inventor: Wayne Tseng, Taipei Hsien (TW)

(73) Assignee: VIA Technologies Inc., Hsien-Tien, Taipei Hsien (TW)

( * ) Notice: Subject to any disclaimer, the term of this patent is extended or adjusted under 35 U.S.C. 154(b) by 639 days.

(21) Appl. No.: 11/162,151

(22) Filed: Aug. 30, 2005

(65) Prior Publication Data

US 2006/0117125 A1   Jun. 1, 2006

Related U.S. Application Data (60) Provisional application No. 60/522,812, filed on Nov. 9, 2004.

(51) Int. Cl.
  *G06F 11/00*   (2006.01)
  *H04N 1/00*   (2006.01)
  *H04W 4/00*   (2009.01)
  *H04B 10/08*   (2006.01)

(52) U.S. Cl. .................. 714/704; 358/426.09; 370/333; 398/9; 398/27

(58) Field of Classification Search .................. 714/704; 358/426.09; 370/333; 398/9, 27
See application file for complete search history.

(56) References Cited

U.S. PATENT DOCUMENTS 5,574,731 A * 11/1996 Qureshi ...................... 714/726
6,622,273 B1 * 9/2003 Barnes ....................... 714/733

OTHER PUBLICATIONS

Altera, 8B10B Encoder/Decoder MegaCore Function User Guide, Dec. 2002, version: 1.3.2 rev1, pp. 1-32.*
Altera, PHY Interface for the PCI Express Architecture, Jun. 19, 2003, version 1.0, pp. 1-31.*
Intel Corporation, PHY Interface for the PCI Express Architecture, Jun. 19, 2003, version 1.0, pp. 1-31.*

* cited by examiner

*Primary Examiner*—John J Tabone, Jr.
(74) *Attorney, Agent, or Firm*—Winston Hsu (57) ABSTRACT

A data receiving apparatus of a PCI Express system includes a receiving device, an 8B10B decoder, a forged packet removing device, and a descrambling circuit. The forged packet removing device determines whether a disparity error occurs; and an offset removing circuit compensates a number of cycles of the lane offset. The data receiving apparatus is capable of eliminating error packet caused by framing error and preventing the problem of symbol disorder and disconnection caused by set ordered noise. Furthermore, the data receiving apparatus is also capable of removing offset.

18 Claims, 7 Drawing Sheets

| $Q_n$ | 0 | 1 | 0 | 1 | $Q_{n-1}$ | $Q_{n-1}$ |
|---|---|---|---|---|---|---|
| CLK | ↙ | ↙ | ↙ | ↙ | 0 | 1 |
| D | 0 | 1 | X | X | X | X |
| TI | X | X | 0 | 1 | X | X |
| TE | 0 | 0 | 1 | 1 | X | X |

DATA RECEIVING APPARATUS OF A PCI EXPRESS DEVICE

CROSS REFERENCE TO RELATED APPLICATIONS

This application claims the benefit of U.S. Provisional Application No. 60/522,812, filed Nov. 9, 2004, and included herein by reference.

BACKGROUND OF THE INVENTION

1. Field of the Invention

The present invention relates a data descrambling device of a PCI (Peripheral Component Interconnect) Express device, and more particularly to a data descrambling device capable of preventing a high bit error rate of a symbol disorder lane.

2. Description of the Prior Art

In following the development of technology, the requirements of bandwidth and speed for interconnected interface in personal computers and peripherals are continuing to increase. As this phenomenon continues it also causes the workload for a PCI bus to increase, hence the third generation input/output (3GIO) interface is being introduced. PCI Express bus can provide a greater bandwidth requirement. As known to those skilled in the art, the technology of PCI Express provides a faster operating clock and more lanes as means for upgrading its efficiency, therefore the first generation PCI Express technology can provide 2.5 GB (Giga Bytes) per second of raw bandwidth in each direction of each lane, hence greatly improving on the efficiency of the computer system. This improvement is especially obvious in the mapping processing.

Therefore, as long as a lane of a PCI Express can maintain a low bit error rate (BER), then the PCI Express can provide a high transmission service to the related devices. However, in actual operation, it is not guaranteed that the lane of the PCI Express can be maintained operating at an ideal (low) BER, and the higher the BER the easier it is to cause disorder to a symbol received at a receiving end which can affect the efficiency to reduce significantly.

Figure 1:
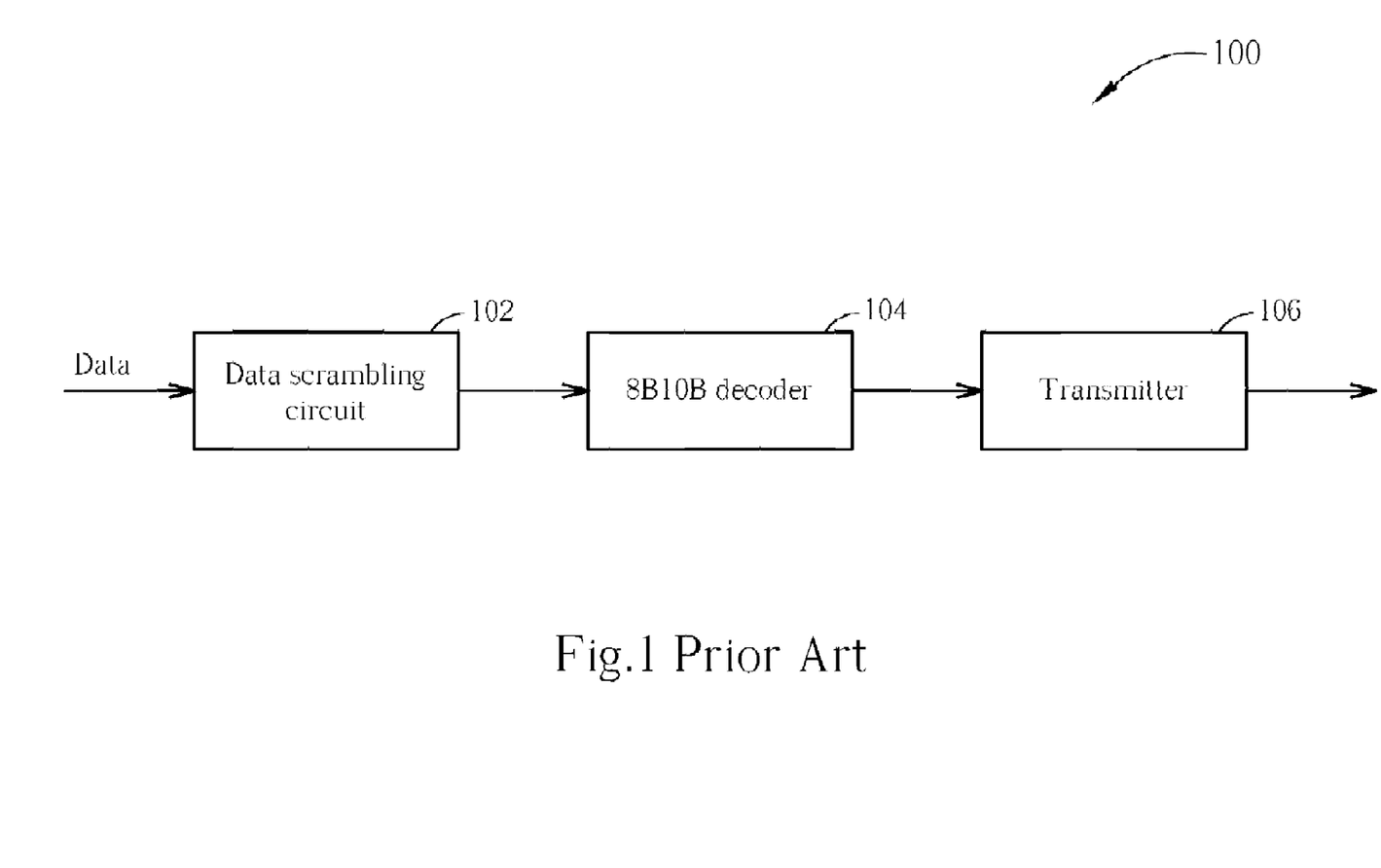
FIG. 1 illustrates a diagram of a transmission end and a receiving end of a conventional PCI Express.
Figure 2:
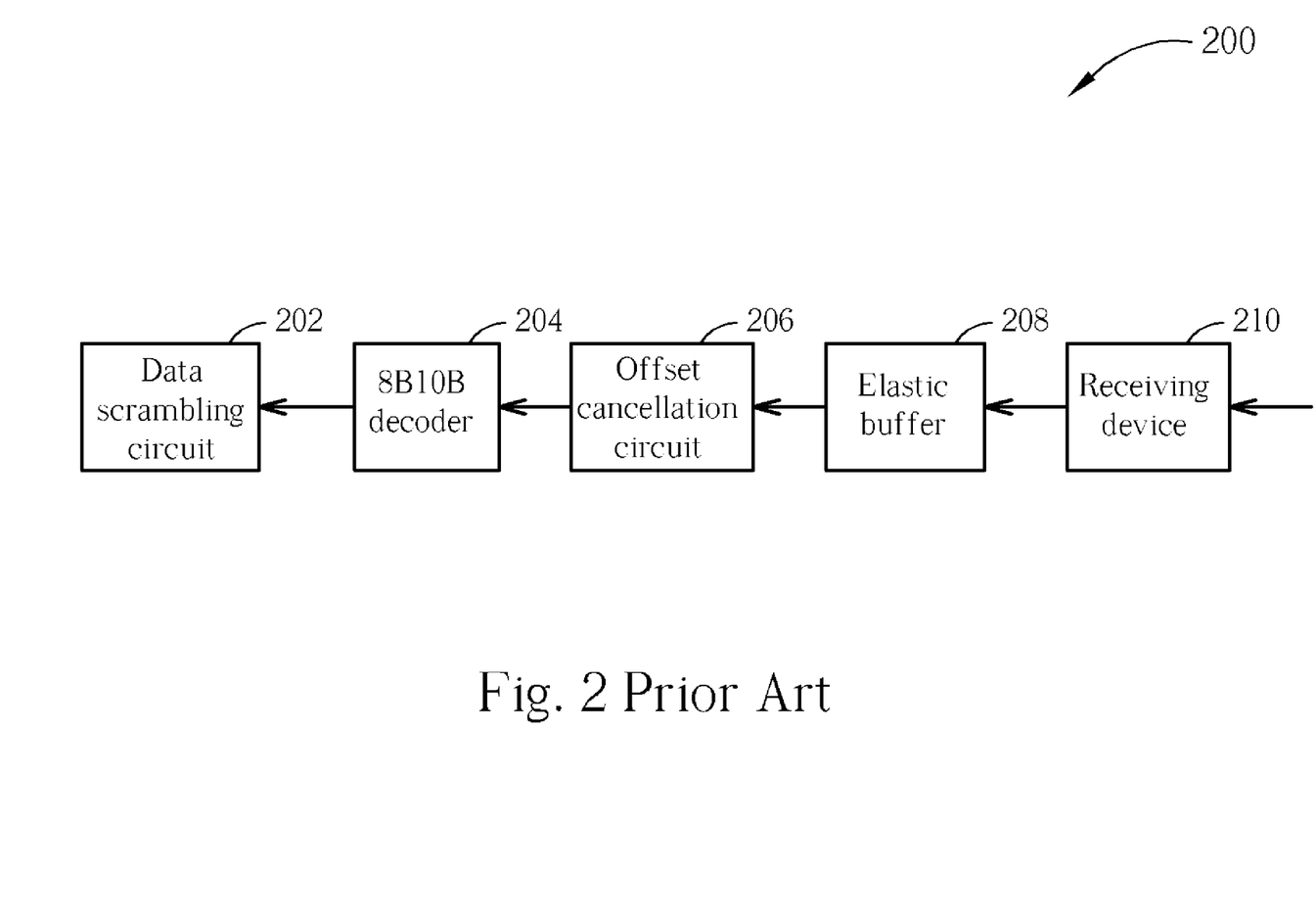
FIG. 2 illustrates a diagram of a transmission end and a receiving end of a conventional PCI Express.

Please refer to FIG. 1 and FIG. 2. FIG. 1 and FIG. 2 illustrate a diagram of a transmission end 100 and a receiving end 200 of a conventional PCI Express. The transmission end 100 includes a data scrambling circuit 102, an 8B10B decoder 104, and a transmitter 106. In FIG. 2 corresponding to FIG. 1, the PCI Express receiving end 200 includes a data scrambling circuit 202, an 8B10B decoder 204, an offset cancellation circuit 206, an elastic buffer 208, and a receiving device 210.

The physical layer of the PCI Express defines functions like coding/decoding of the 8B10B, scramble/descramble of data, and offset removal. The coding/decoding of the 8B10B can ensure that the receiving end 200 can receive a correct symbol; and the scramble/descramble of data can eliminate disturbance and electric magnetic effect in the lane. Furthermore, as operating clocks of the transmission end 100 and the receiving end 200 are different, therefore if the operating clock of the transmission end 100 is faster than the operating clock of the receiving end 200, then the transmission rate of output data-flow of the transmission end 100 will be faster than the receiving rate of retrieval data-flow of the receiving end 200, which will cause data to overflow. On the contrary, if the operating clock of the transmission end 100 is slower than the operating clock of the receiving end 200, then the transmission rate of the output data-flow of the transmission end 100 will be slower than the receiving rate of the retrieval data-flow of the receiving end 200, which will cause data to underflow. Therefore in order to solve the problem of different operating clocks of the transmission end 100 and the receiving end 200, the elastic buffer 208 is installed within the receiving end 200 which has a plurality of elastic buffers for regulating the data in the lane transmitted via the transmission end 100.

According to the PCI Express standards, the transmission end 100 will output an ordered set to the elastic buffer to balance the different operating clocks of the transmission end 100 and the receiving end 200. For example, each ordered set outputted by the transmission end 100 has a COM (COMMA) symbol and three SKP (SKIP) symbols. Therefore when an elastic buffer in the receiving end 200 receives a plurality of ordered sets, if the operating clock of the transmission end 100 is faster than the operating clock of the receiving end 200, the elastic buffer can achieve the objective of reducing the data transmission rate of the transmission end 100 via the reduced SKP symbols in the ordered set. Alternatively, if the operating clock of the transmission end 100 is slower than the operating clock of the receiving end 200, the elastic buffer can achieve the objective of upgrading the data transmission rate of the transmission end 100 via the increased SKP symbols in the ordered set. As a result, the above-mentioned problem can be avoided.

The PCI Express standards define five types of ordered sets. To reduce power consumption, when there is no packet in the lane of the PCI Express, the transmission end of the PCI Express will transmit an electrical idle set ordered to the receiving end. The electrical idle ordered set is formed by a COM symbol followed by three logic idle symbols where raw data of the logic idle symbol (before data scramble) is 0 byte (corresponding to the decoding of the 8B10B). Therefore if the decoding of the 8B10B of the receiving end of the PCI Express is accurate and the data descramble is error-free, then the receiving end can receive the raw 0 byte data. However, the BER of the lane of the actual PCI Express chipset and apparatus may not be lower than $10^{-12}$. When the BER of the lane exceeds $10^{-12}$, the logic idle symbol will be incorrectly decoded (i.e., a framing error will be obtained), more importantly, the logic idle symbol may be treated as a packet framing symbol or an ordered set as a result of the inaccurate data after descrambling. If the logic idle symbol is processed as a packet framing symbol, then the receiving end will report to an upper layer (e.g., such as a media access control layer) and execute a related action. Hence work is carried out during the system idle (as there is no actual packet framing symbol to be processed). Furthermore, if the logic idle symbol is processed as a set ordered, the connection of the physical layer of the PCI Express will be easily cut off. Therefore, the system efficiency will be greatly reduced when the BER of the lane of the PCI Express is too high.

SUMMARY OF THE INVENTION

The claimed invention provides a data descrambling device of a PCI Express device.

A data receiving apparatus of the claimed invention includes: a receiving device for receiving a data signal; an 8B10B decoder couples to the receiving device for decoding the data signal; a forged packet removing device couples to the 8B10B decoder for outputting the decoded data signal or a symbol according to the decoded data determining whether a disparity error occurs after receiving the decoded data signal; and a descrambling circuit couples to the forged packet removing device for descrambling the data signal A forged packet removing device of the claimed invention utilized in a data receiving apparatus for outputting an input signal or an output signal according to a command determining whether a disparity error occurs before data enters a descrambling circuit. The forged packet removing device includes: a first input end for receiving an input signal; a second input end for receiving the command signal; a third input end for receiving a symbol; and an output end for outputting the output signal or the input signal.

A data descrambling circuit of the claimed invention for descrambling a data signal. The data descrambling circuit includes: an OR gate, a flip-flop, and a linear feedback shift resister (LFSR), wherein an input end of the LFSR is coupled to an output end of the flip-flop, an output end of the LFSR is coupled to an input end of the flip-flop, the OR gate has two input ends for receiving a first command and a second command respectively, and the flip-flop receives output of the LFSR, output of the OR gate, and a predetermined value respectively.

These and other objectives of the present invention will no doubt become obvious to those of ordinary skill in the art after reading the following detailed description of the preferred embodiment that is illustrated in the various figures and drawings.

DETAILED DESCRIPTION

The present invention is capable of eliminating error packets caused by framing errors and preventing symbol disorder and disconnection caused by the noise of set ordered. Furthermore, the present invention is capable of canceling offset.

Figure 3:
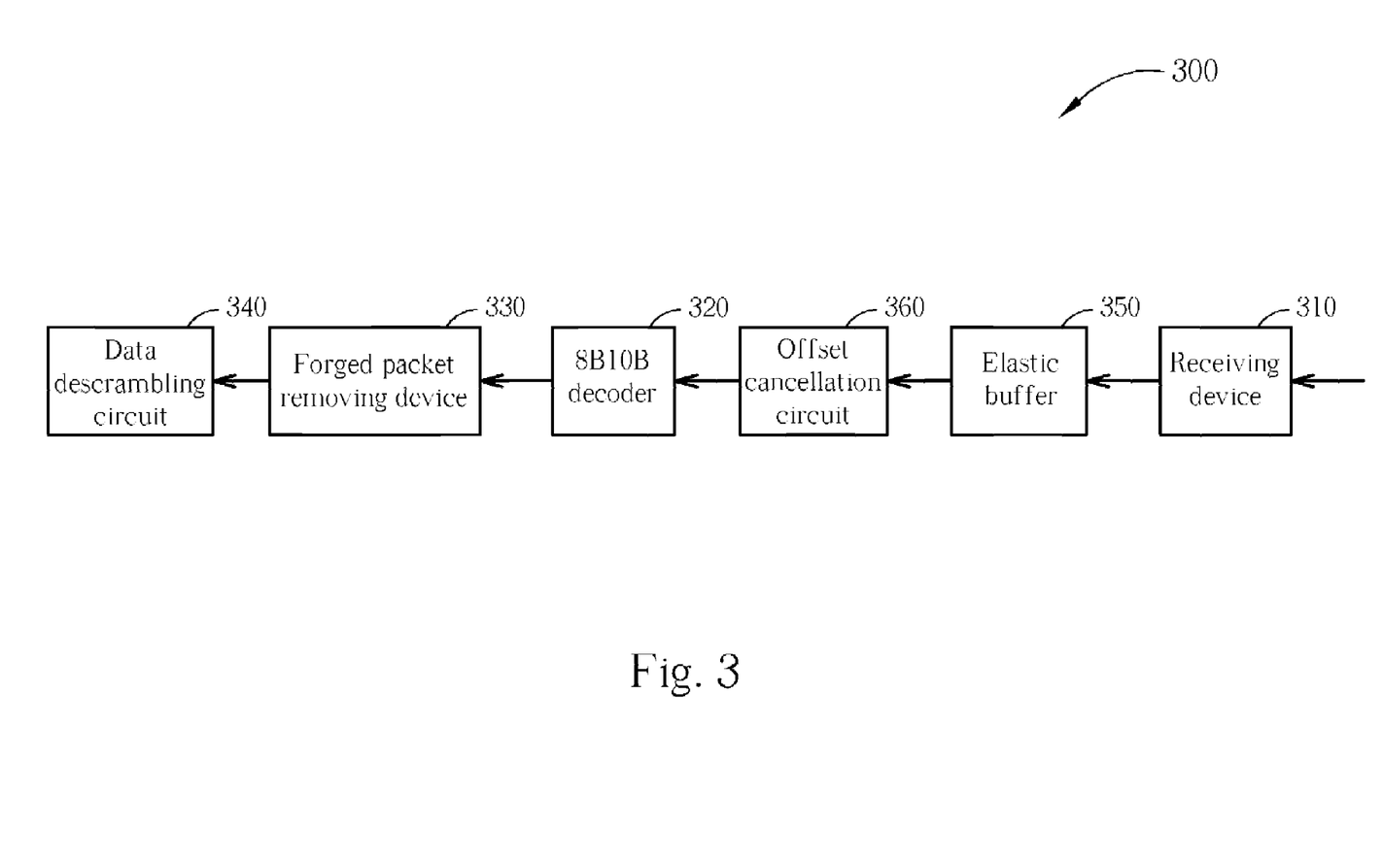
FIG. 3 illustrates a diagram of a data receiving apparatus according to the present invention.
Figure 4:
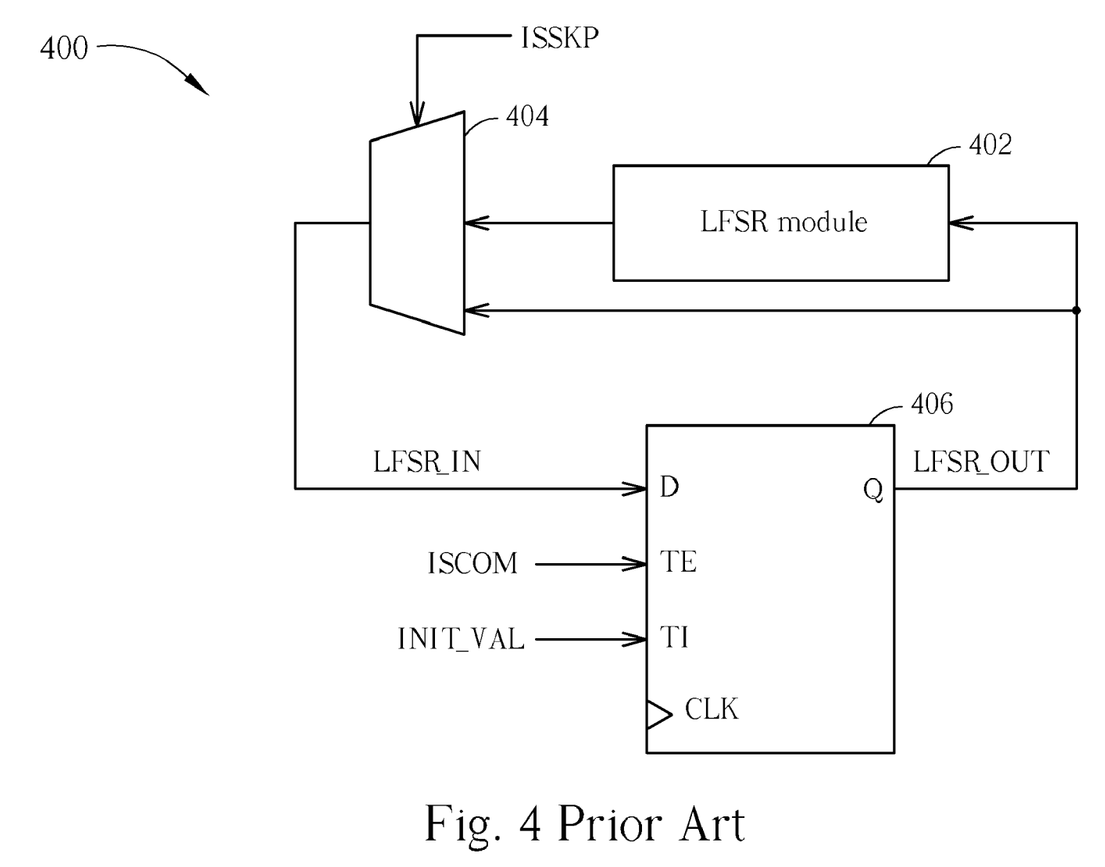
FIG. 4 illustrates a diagram of a prior art data descrambling circuit.

Please refer to FIG. 3. FIG. 3 illustrates a diagram of a data receiving apparatus 300 according to the present invention. The data receiving apparatus 300 includes a receiving device 310, an 8B10B decoder 320, a forged packet removing device 330, and a data descrambling circuit 340. The receiving device 310 receives a data signal; the 8B10B decoder 320 is coupled to the receiving device 310 for decoding the data signal; the forged packet removing device 330 is coupled to the 8B10B decoder 320 for outputting the decoded data signal or a symbol according to the decoded data determining whether a disparity error occurs after receiving the decoded data signal; and the descrambling circuit 340 is coupled to the forged packet removing device 330 for descrambling the data signal. The symbol used in the forced packet removing device 330 can be received from the 8B10B decoder 320. Furthermore, the data receiving apparatus 300 further includes an elastic buffer 350 and an offset removing circuit 360. The elastic buffer 350 is coupled to the receiving device 310 for receiving signals from each lane; and the offset removing circuit 360 is coupled to and disposed between the elastic buffer 350 and the 8B10B decoder 320 for compensating a number of cycles of the lane offset Please refer to FIG. 4. FIG. 4 illustrates a diagram of a prior art data descrambling circuit 400. The data descrambling circuit 400 includes a linear feedback shift resister (LFSR) logic module 402, a selector 404, and a MUX (Multiplexing) D-type flip-flop 406.

Figure 5:
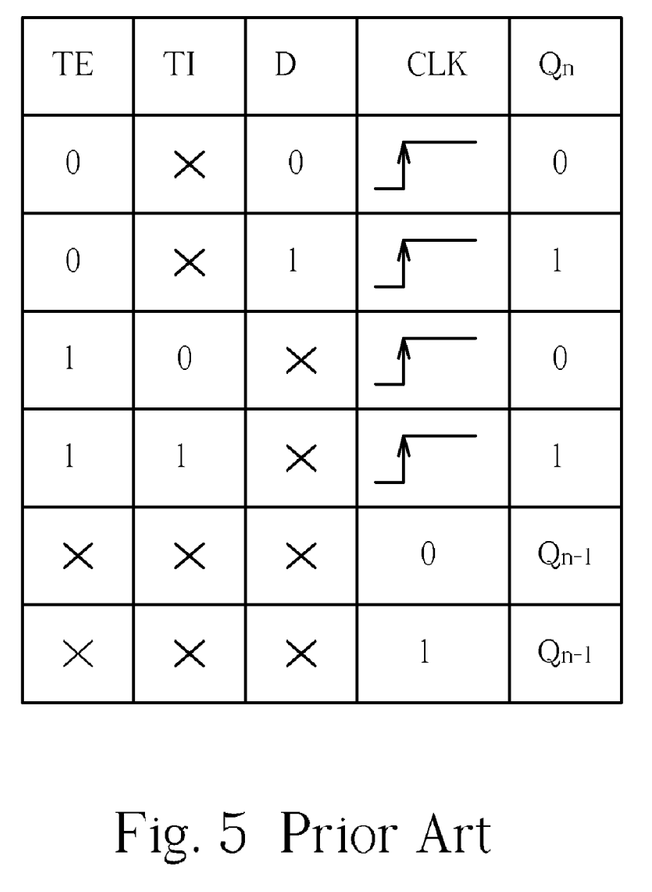
FIG. 5 illustrates a truth table of a MUX D-type flip-flop.

Please refer to FIG. 5. FIG. 5 illustrates a truth table of a MUX D-type flip-flop 406. Please note that the operation of the MUX D-type flip-flop 406 and the LFSR logic module 402 are well known to those skilled in the art and they are not the focus of the present invention, therefore they will not be further mentioned.

When the data descrambling circuit 400 receives a COM symbol, a command ISCOM (is COMMA) will be asserted so that an output signal LFSR_OUT (Linear Feedback Shift Resister Output) of the logic gate 406 will be replaced by an initial value uNIT_VAL (Initial Value). When the data descrambling circuit 400 receives a non-COM symbol, the LFSR logic module 402 will operate according to the output signal LFSR_OUT of the logic gate 406. When the data descrambling circuit 400 receives a SKP symbol, a command ISSKP (is SKIP) will be asserted so that a signal LFSR_IN (Linear Feedback Shift Resister Input) will be latched in the signal LFSR_OUT. And when the data descrambling circuit 400 receives a non-SKP symbol, the signal LFSR_IN will be latched in an output signal of the LFSR logic module 402, at this time an input signal of the LFSR logic module 402 is the LFSR_OUT signal.

Figure 6:
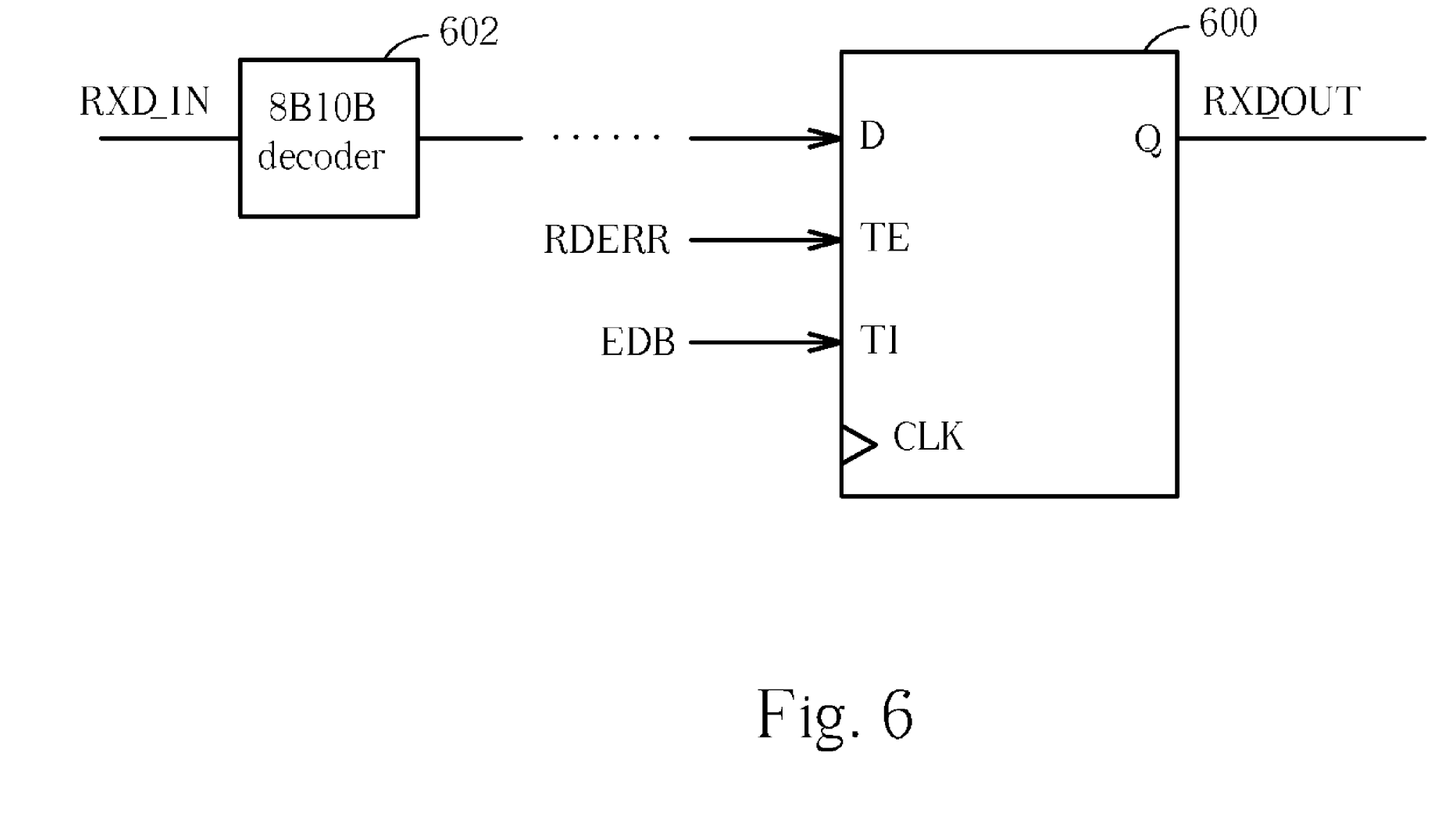
FIG. 6 illustrates a diagram of a forged packet removing device of a PCI Express device.

Please refer to FIG. 6. FIG. 6 illustrates a diagram of a forged packet removing device 600 of a PCI Express device. The forged packet removing device 600 is a MUX D-type flip-flop. Please refer to the truth table shown in FIG. 5 for the detail description of the operation of the MUX D-type flip flop.

A D end of the forged packet removing device 600 receives an eight bit signal outputted from an 8B10B decoder 602; a TE (Test Enable) end and a TI (Test Input) end receives a command RDERR (Running Disparity Error) and a symbol EDB (Embedded Data Bits) from the 8B10B decoder 602 respectively. After the 8B10B decoder 602 receives a signal RXD_IN (Receiver Data Input) outputted from a previous level circuit, the signal RXD_IN is decoded to be as an eight bit symbol and outputted to the D end of the forged packet removing device 600.

If no disparity error occurs at this time, the command RDERR will not be asserted, a signal RXD_OUT (Receiver Data Output) outputted by an output end Q end of the forged packet removing device 600 equals to the signal received by the D end of the forged packet removing device 600.

In short, before inputting to a next level circuit the signal that is outputted by the 8B10B decoder, the forged packet removing device 600 output different signals to indicate if a disparity error occurs in the signal, if so, then the data link layer module of the PCI Express device is then prompted according to the output of the forged packet removing device 600. Therefore misjudging the logic idle symbol can be prevented so that there will be no work carried out when the system is idle. As mentioned previously, when the BER of the lane exceeds 10.sup.-12, the logic idle symbol may be mistaken for a packet framing symbol or an ordered set that can cause an error in the system, which may result in disconnection and hence this affects the efficiency of the system greatly. Before a signal enters a next level descrambling circuit, the forged packet removing device 600 outputs the signal RXD_IN or the symbol EDB according to the command RDERR indicating disparity error to solve the above-mentioned problem, wherein the forged packet removing device 600 is not a fixed circuit structure. Therefore any application can utilize the forged packet removing device 600 of the present invention as long as it is capable of realizing of the MUX D-type flip flop truth table of FIG. 5.

Figure 7:
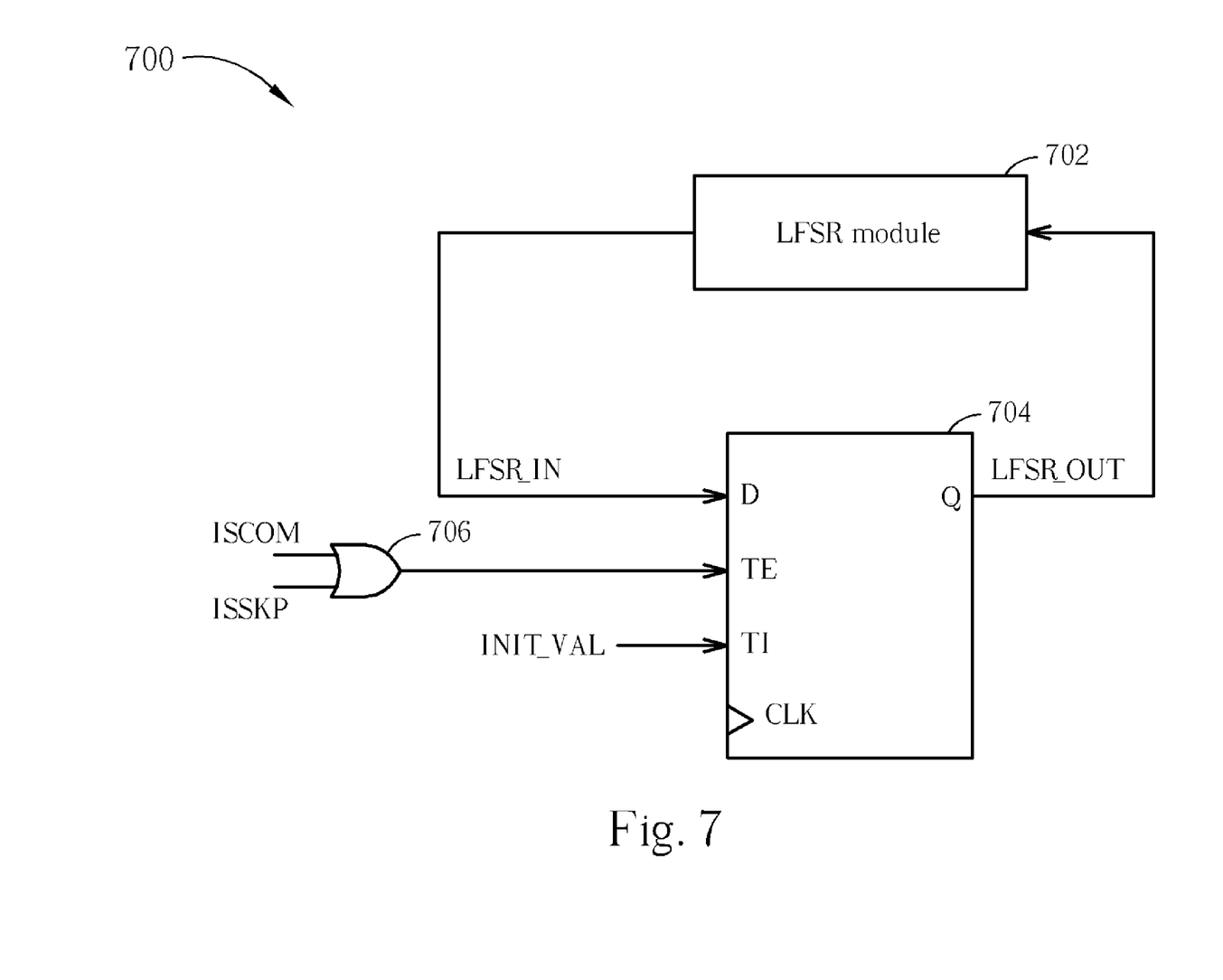
FIG. 7 illustrates a diagram of a descrambling circuit of a PCI Express device according to the present invention.

Please refer to FIG. 7. FIG. 7 illustrates a diagram of a descrambling circuit 700 of a PCI Express device according to the present invention. The descrambling circuit 700 includes a linear feedback shift resister (LFSR) logic module 702, a MUX D-type flip-flop 704, and an OR gate 706. When the descrambling circuit 700 receives a COM symbol or an SKP symbol, commands ISCOM or ISSKP will be asserted so that a signal LFSR_OUT outputted by the MUX D-type flip flop 704 is replaced by an initial value WIT_VAL. When the data descrambling circuit 700 receives a non-COM symbol or a non-SKP symbol, the LFSR logic module 702 will continue to operate according to the output signal LFSR_OUT of the MUX D-type flip-flop 706.

Therefore, while receiving the COM symbol or the SKP symbol, the descrambling circuit 700 replaces the output signal of the MUX D-type flip-flop 704 to the initial value, and when the symbol received by the descrambling circuit 700 is a normal symbol, the LFSR logic module 702 will continue to operate according to the signal LFSR_OUT wherein the MUX D-type flip-flop 704 is not a fixed circuit structure, therefore any application can utilize the MUX D-type flip-flop of the present invention as long as it is capable of realizing of the MUX D-type flip-flop truth table of FIG. 5.

As previously mentioned, the offset removing circuit includes a plurality of counters, with each counter corresponding to a lane for counting a number of cycles of signal offset in each lane. According to the number of signal offset cycles counted by each counter, the offset removing circuit can compensate the offset of each lane and transmit the signal to a decoder of another level, which means that after a lane receives a COM symbol, the counter of the offset removing circuit will start counting. Therefore, when there is an error generated in the COM symbol (e.g., perhaps due to noise), the number of signal offset cycles may be negative. In this situation, unless the number of signal offset cycles switches to zero or positive, the number of signal offset cycles will then be utilized for updating signals.

In conclusion to the above-mentioned, the BER of the lane of the actual PCI Express chipset and apparatus may not be lower than 10-12. When the BER of the lane exceeds 10-12, the logic idle symbol will be decoded wrongly (i.e., framing error obtained). More importantly, the logic idle symbol may be treated as a packet framing symbol or an ordered set as a result of the inaccurate data after descrambling. If the logic idle symbol is processed as a packet framing symbol, then the receiving end will report to an upper layer (such as a media access control layer) and execute a related action, hence work is carried out during the system idle. Furthermore, if the logic idle symbol is processed as a set ordered, the connection of the physical layer of the PCI Express will be easily cut off. Therefore, by combining the forged packet removing device 600 and the descrambling circuit 700, the signal outputted to the by the 8B10B decoder can determine whether a disparity error occurs. And when there is no disparity error, the decoded signal outputted by the 8B10B decoder is then inputted to the descrambling circuit 700 of the next level, hence completes the operation of descrambling. As a result, the present invention is capable of eliminating error packers caused by framing error obtained and preventing the problem of symbol disorder and disconnection caused by set ordered noise. Furthermore the present invention is capable of canceling offset. Hence, the present invention is capable of preventing the problem of symbol disorder caused by the high BER of the lane.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data receiving apparatus, comprising:
 a receiving device for receiving a data signal;
 an 8B10B decoder coupled to the receiving device for decoding the data signal;
 a forged packet removing device coupled to the 8B10B decoder for outputting either the data signal from the 8B10B decoder or a symbol according to whether a disparity error occurs; and
 a descrambling circuit coupled to the forged packet removing device for descrambling the data signal;
 wherein if the disparity error occurs, the forged packet removing device outputs the symbol; if the disparity error does not occur, the forged packet removing device outputs the data signal from the 8B10B decoder.

2. The data receiving apparatus of claim 1 wherein the receiving device further comprises:
 an elastic buffer coupled to the receiving device for receiving signals from each of a plurality of lanes for transferring the data signal; and
 an offset cancellation circuit coupled to and disposed between the elastic buffer and the 8B10B decoder for compensating a number of cycles of a lane offset of each of the plurality of lanes.

3. The data receiving apparatus of claim 1 wherein the forged packet removing device is a MUX (Multiplexing) D-type flip-flop.

4. The data receiving apparatus of claim 1 wherein the forged packet removing device receives a command signal and the symbol from the 8B10B decoder for indicating whether the disparity error occurs.

5. The data receiving apparatus of claim 4 wherein the command signal is asserted and the forged packet removing device outputs the symbol for notifying the descrambling circuit when the disparity error occurs.

6. The data receiving apparatus of claim 1 wherein the descrambling circuit comprises:
 an OR gate;
 a flip-flop; and
 a linear feedback shift resister (LFSR);
 wherein an input end of the LFSR is coupled to an output end of the flip-flop; an output end of the LFSR is coupled to an input end of the flip-flop; the OR gate comprises two input ends for receiving a first command and a second command respectively; and the flip-flop is used for receiving output of the LFSR, output of the OR gate, and a predetermined value.

7. The data receiving apparatus of claim 6 wherein the data signal comprises an ordered set for adjusting an operating clock to balance the data signal latency caused by the operating clock, and the ordered set comprises a COM (COMMA) symbol and three SKP (SKIP) symbols.

8. The data receiving apparatus of claim 7 wherein the first command is asserted when the descrambling circuit receives the COM symbol, and the second command is asserted when the descrambling circuit receives the SKP symbol.

9. The data receiving apparatus of claim 8 wherein the flip-flop outputs the predetermined value when the descrambling circuit receives the COM symbol or the SKP symbol.

10. The data receiving apparatus of claim 6 wherein the flip-flop is a MUX D-type flip-flop.

11. The data receiving apparatus of claim 1 wherein the data receiving apparatus is applied to a PCI Express device.

12. A forged packet removing device of a data receiving apparatus for outputting either a data signal or a symbol according to whether a disparity error occurs, the forged packet removing device comprising:
   a first input end for receiving the data signal;
   a second input end for receiving a command signal for indicating whether the disparity error occurs;
   a third input end for receiving the symbol; and
   an output end, wherein the output end outputs the data signal while the command signal indicates the disparity error does not occur; and the output end outputs the symbol while the command signal indicates the disparity error occurs.

13. The forged packet removing device of claim 12 wherein the command signal is asserted and the symbol is outputted to the output end when a disparity error occurs.

14. The forged packet removing device of claim 12 wherein the command signal is not asserted and the input signal is outputted to the output end when there is no disparity error.

15. The forged packet removing device of claim 12 wherein the forged packet removing device is a MUX D-type flip-flop.

16. A data descrambling circuit for descrambling a data signal, comprising:
   an OR gate;
   a flip-flop; and
   a linear feedback shift resister (LFSR);
   wherein an input end of the LFSR is coupled to an output end of the flip-flop; an output end of the LFSR is coupled to an input end of the flip-flop; the OR gate comprises two input ends for receiving a first command and a second command respectively; the flip-flop is used for receiving output of the LFSR, output of the OR gate, and a predetermined value; the data signal comprises an ordered set for adjusting an operating clock to balance a latency of the data signal caused by the operating clock, and the ordered set comprises a COM symbol and three SKP symbols; and the first command is asserted when the descrambling circuit receives the COM symbol, and the second command is asserted when the descrambling circuit receives the SKP symbol.

17. The data descrambling circuit of claim 16 wherein the flip-flop outputs the predetermined value when the COM symbol or the SKP symbol is received.

18. The data descrambling circuit of claim 16 wherein the flip-flop is a MUX D-type flip-flop.

* * * * *

UNITED STATES PATENT AND TRADEMARK OFFICE
CERTIFICATE OF CORRECTION

PATENT NO. : 7,613,959 B2 Page 1 of 1
APPLICATION NO. : 11/162151
DATED : November 3, 2009
INVENTOR(S) : Wayne Tseng It is certified that error appears in the above-identified patent and that said Letters Patent is hereby corrected as shown below:

On the title page, item (73), correct the residence of the assignee from "Hsien-Tien" to "Hsin-Tien".

Signed and Sealed this

Thirty-first Day of August, 2010

David J. Kappos
*Director of the United States Patent and Trademark Office*